(12) United States Patent
Mitani et al.

(10) Patent No.: US 8,873,171 B2
(45) Date of Patent: Oct. 28, 2014

(54) LENS BARREL AND LENS UNIT

(71) Applicants: Yoshifumi Mitani, Osaka (JP); Kenichi Miyaji, Sakai (JP)

(72) Inventors: Yoshifumi Mitani, Osaka (JP); Kenichi Miyaji, Sakai (JP)

(73) Assignee: Konica Minolta Advanced Layers, Inc. (JP)

( * ) Notice: Subject to any disclaimer, the term of this patent is extended or adjusted under 35 U.S.C. 154(b) by 131 days.

(21) Appl. No.: 13/713,258

(22) Filed: Dec. 13, 2012

(65) Prior Publication Data

US 2013/0155531 A1    Jun. 20, 2013

(30) Foreign Application Priority Data

Dec. 16, 2011    (JP) ................. 2011-275690

(51) Int. Cl.
*G02B 7/02*    (2006.01)
*G02B 7/04*    (2006.01)
*G02B 7/08*    (2006.01)
*G02B 7/10*    (2006.01)

(52) U.S. Cl.
CPC .. *G02B 7/10* (2013.01); *G02B 7/04* (2013.01); *G02B 7/08* (2013.01)
USPC ........................................ 359/823

(58) Field of Classification Search
CPC ........................................... G02B 7/04
USPC ........................................ 359/823
See application file for complete search history.

(56) References Cited

U.S. PATENT DOCUMENTS 5,898,526 A * 4/1999 Yoshibe et al. ........... 359/696

FOREIGN PATENT DOCUMENTS

JP    6-11636 A    1/1994

* cited by examiner

*Primary Examiner* — James Jones
(74) *Attorney, Agent, or Firm* — Cantor Colburn LLP (57) ABSTRACT

A lens barrel and a lens unit each include a lens drive operation member that drives a lens holding member holding a movable lens group, in an axial direction by a rotation operation of a rotating member. This lens drive operation member has a body disposed so as to be rotatable about an axis of a fixed barrel and so as not to be movable in the axial direction and connected to the rotating member by a connecting portion, and the connecting portion includes at least two connecting members, that is, a first connecting member formed integrally with the body, and a second connecting member formed separately from the body.

6 Claims, 8 Drawing Sheets

LENS BARREL AND LENS UNIT

BACKGROUND OF THE INVENTION

1. Field of the Invention

The present invention relates to a lens barrel of a camera and a lens unit.

2. Description of the Related Art

Conventionally, a lens barrel of a camera capable of switching between an auto focus operation and a manual focus operation in a non-manipulating manner is known, and is disclosed, for example, in Japanese Patent Application Laid-open No. H6-11636. The lens barrel disclosed in Japanese Patent Application Laid-open No. H6-11636 includes a fixed barrel, a movable lens holding member (lens holder) that holds a movable lens group and is movably disposed on the fixed barrel, a rotating member that holds rolling rollers rolling in a state of being sandwiched with constant urging force, and is disposed to be rotatable with respect to the fixed barrel, a single rod-like lens drive operation member that connects the movable lens holding member and the rotating member, and drives the movable lens holding member. In this lens barrel, a cam screw provided on the movable lens holding member is inserted into a cutout provided on the rotating member through a cam groove provided on the fixed barrel. In such a lens barrel, the rotating member is rotationally driven by actuation of a motor, or a manual operation, the rotating member operates in response to the actuation of the motor or the manual operation, and at the time of this movement, the cam screw inserted into the cutout is pressed to move through the cam groove. Due to this, it is possible to perform a drive operation of the movable lens holding member holding the movable lens group, in an axial direction with respect to the fixed barrel.

The lens barrel disclosed in Japanese Patent Application Laid-open No. H6-11636 transmits rotational force of the rotating member to the movable lens holding member with the single rod-like lens drive operation member, and hence force other than force in a rotational direction largely acts on the rotating member. Therefore, a pressed state of the rolling rollers rolling in the state of being sandwiched with the constant urging force becomes unstable, and transmission efficiency is lowered. A drive loss in driving the movable lens group is large, and great force is required in order to perform the drive operation, with respect to the fixed barrel, of the movable lens holding member holding the movable lens group.

SUMMARY OF THE INVENTION

The present invention is made in view of the aforementioned circumstances, and the object thereof is to provide a lens barrel and a lens unit, capable of smoothly performing a drive operation of a movable lens holding member holding a movable lens group with respect to a fixed barrel with force smaller than ever before.

A lens barrel and a lens unit according to the present invention each include a lens drive operation member that drives a lens holding member holding a movable lens group, in an axial direction by a rotation operation of a rotating member. This lens drive operation member has a body disposed so as to be rotatable about an axis of a fixed barrel and so as not to be movable in the axial direction and connected to the rotating member by a connecting portion, and the connecting portion includes at least two connecting members, that is, a first connecting member formed integrally with the body, and a second connecting member formed separately from the body. In the lens barrel and the lens unit, the movable lens group can be smoothly driven with respect to the fixed barrel with smaller force.

These and other objects, features and advantages of the present disclosure will become more apparent upon reading the following detailed description along with the accompanying drawings.

BRIEF DESCRIPTION OF THE DRAWINGS

FIG. 2A and FIG. 2B each are a figure showing a structure of a fixed barrel included in the lens unit.

DESCRIPTION OF THE PREFERRED EMBODIMENTS

Hereinafter, an embodiment according to the present invention will be described with reference to figures. Configurations denoted by the same reference numerals in the respective figures are the same configuration, and the description thereof will be appropriately omitted. In the present Description, when being collectively referred, the configurations are denoted by reference numerals with no subscripts, while when individual configurations are indicated, the configurations are denoted by reference numerals with subscripts.

Figure 1:
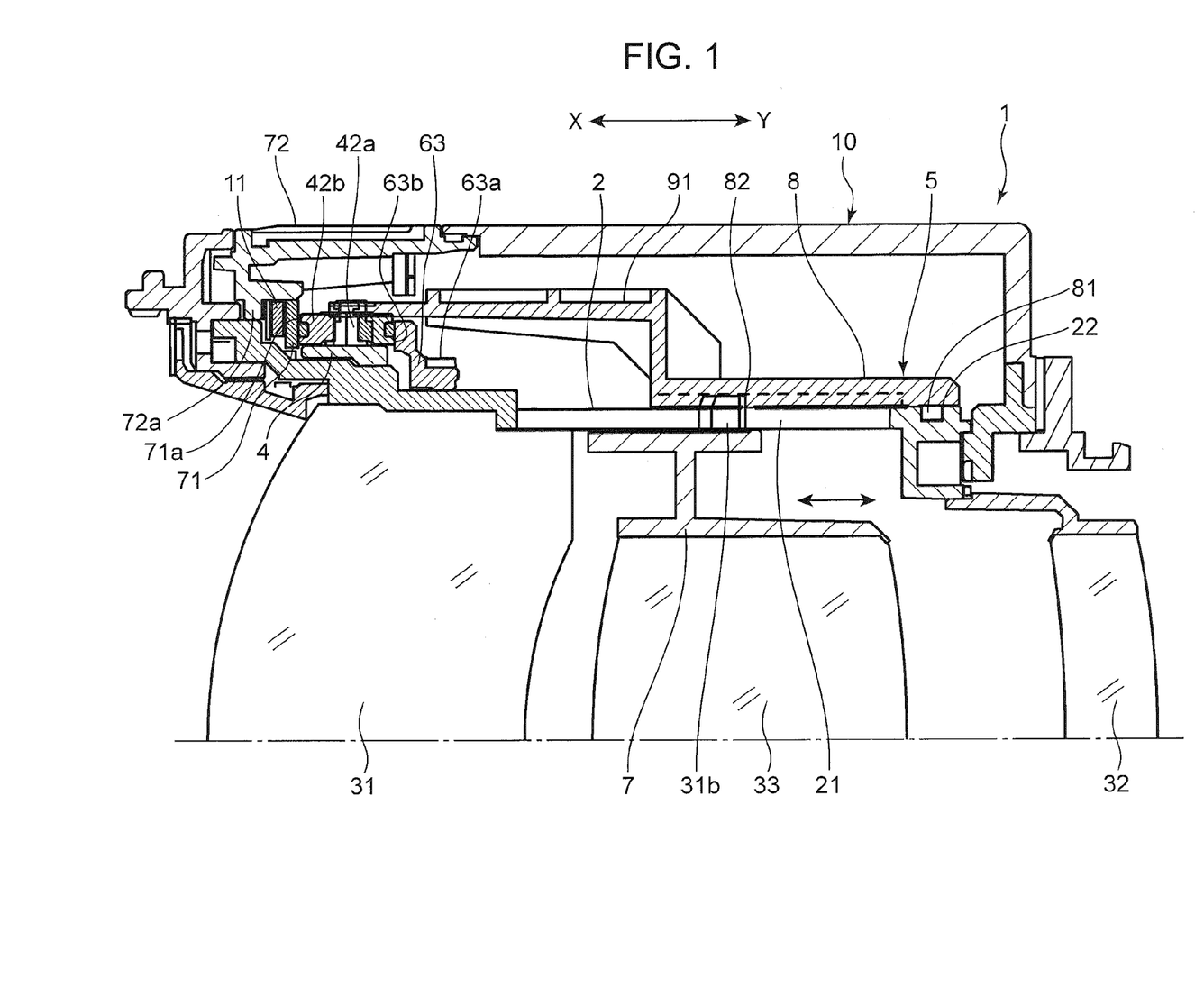
FIG. 1 is a half sectional view showing a structure of a lens unit according to an embodiment of the present invention.
Figure 2A:
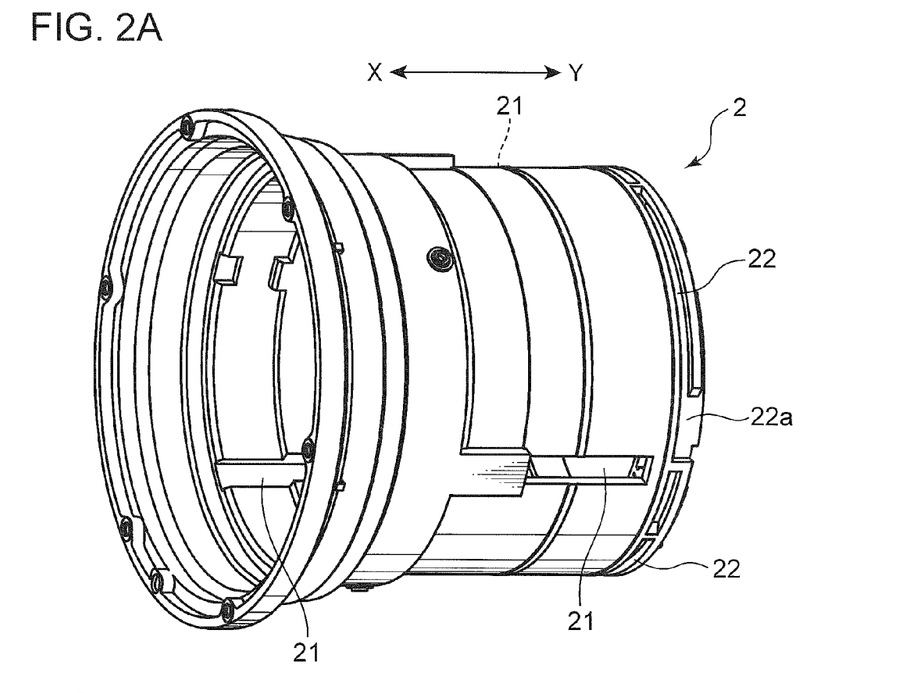
FIG. 2A is a perspective view.
Figure 2B:
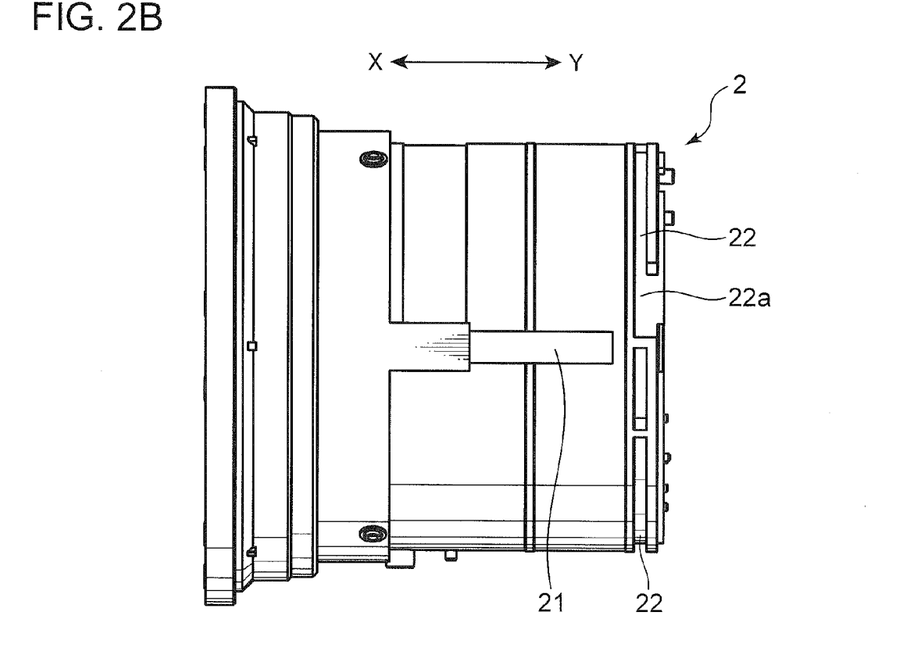
FIG. 2B is a side elevational view.
Figure 3:
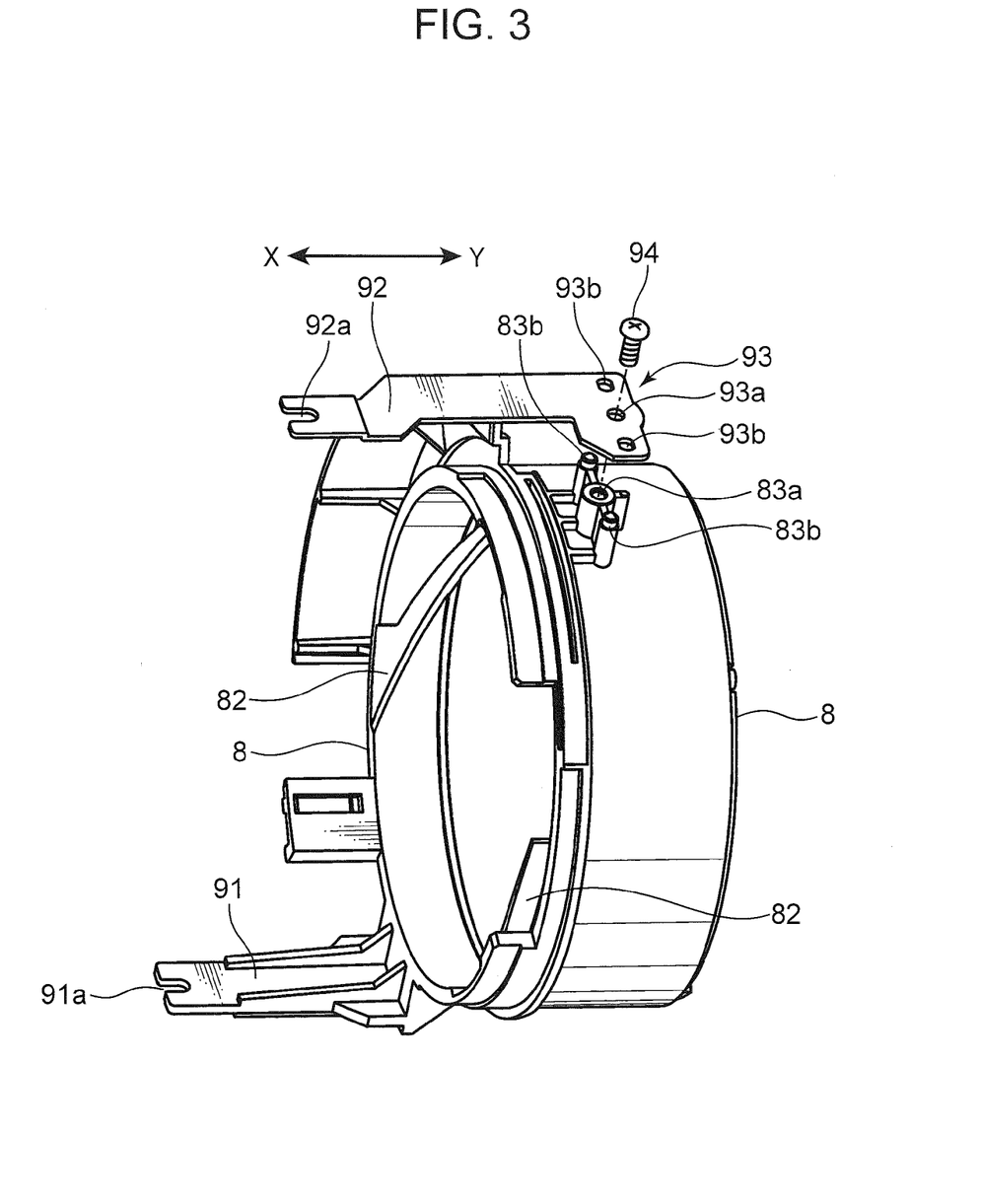
FIG. 3 is an exploded perspective view of a lens drive operation member included in the lens unit.
Figure 5:
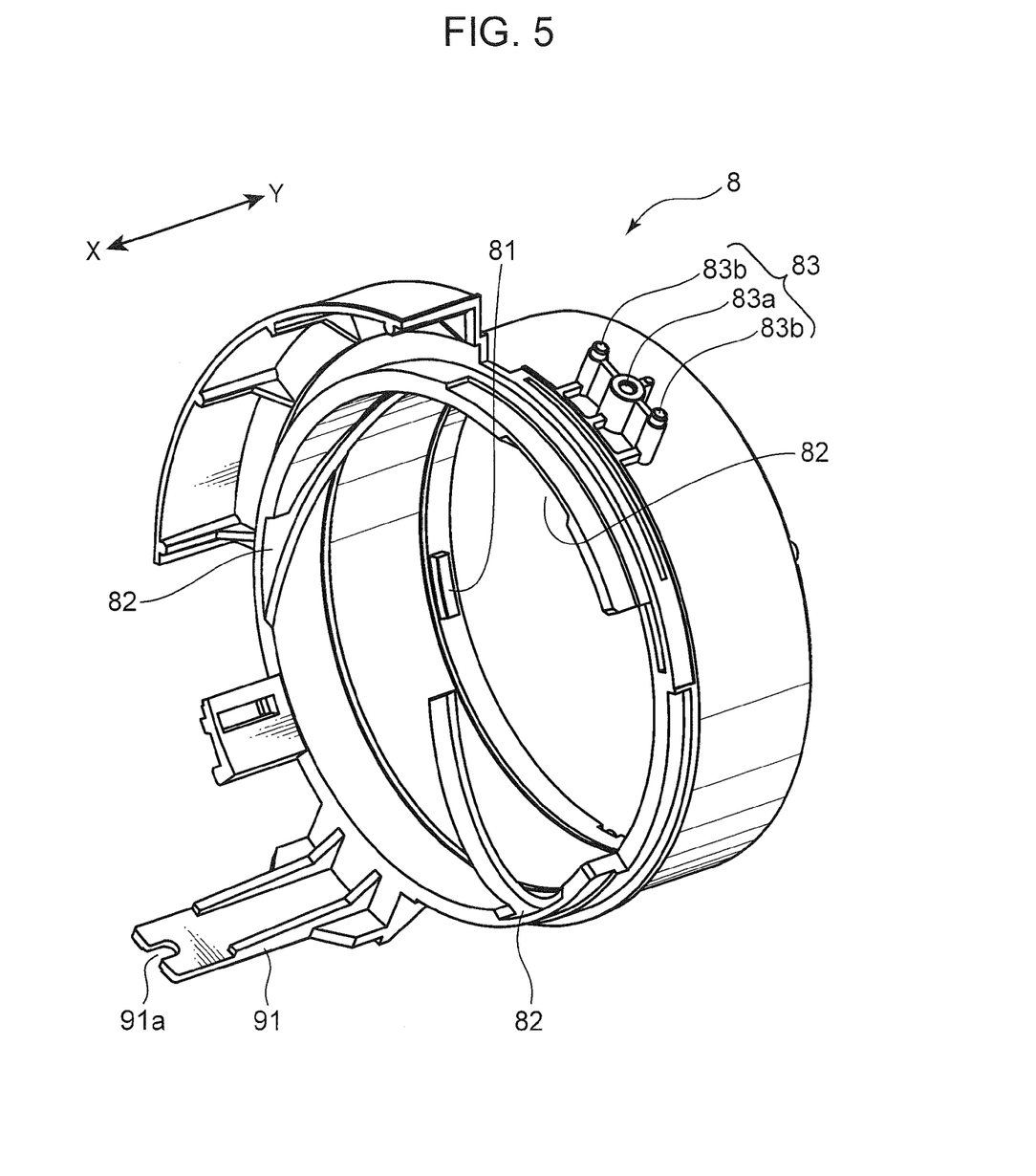
FIG. 5 is a perspective view of a drive operation member body of the lens drive operation member.
Figure 6:
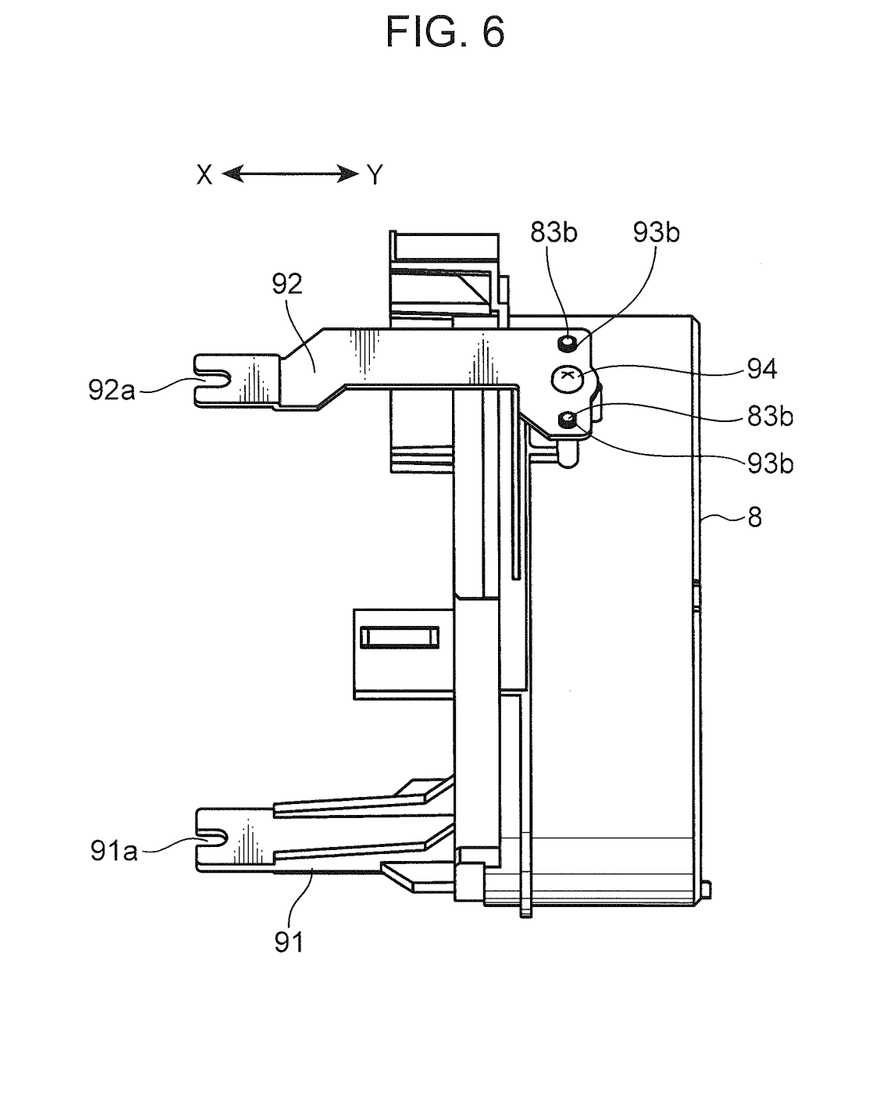
FIG. 6 is a side elevational view of the lens drive operation member.

In FIG. 1 to FIG. 3, a lens unit 1 of this embodiment includes a lens barrel 10 and lens groups 31 to 33. In the description, a direction X in FIG. 1 to FIG. 3 is defined as a front side (object side), and a direction Y is defined as a rear side (image side). The same applies to FIG. 5 to FIG. 7.

According to this embodiment, the lens groups include the fixed lens groups 31 and 32 disposed on a front section and a rear section of the lens barrel 10 respectively, and the movable lens group 33 disposed between the fixed lens groups 31 and 32 and moving along an optical axis direction.

The lens barrel 10 includes a cylindrical fixed barrel 2, an auto focus operation portion, a manual focus operation portion, a rotating member 4, a movable lens holding member (a lens holder) 7, and a lens drive operation member 5.

As shown in FIG. 1, the fixed barrel 2 fixedly holds the fixed lens groups 31 and 32 on both inner circumferential front and rear sides, respectively. The fixed barrel 2 includes guide grooves 21 formed between the held fixed lens groups 31 and 32 and guiding the movable lens holding member 7, and engaging grooves 22 engaging with a drive operation member body 8 of the lens drive operation member described later.

The guide grooves 21 are configured from three guide grooves with the same configuration disposed at equal intervals in a circumferential direction, as shown in FIG. 2A and FIG. 2B. Each guide groove 21 is formed in an elongate rectangular shape elongated in an axial direction of the fixed barrel 2 along the axial direction so as to penetrate from an outer circumferential surface of the fixed barrel 2 to an inner circumferential surface.

The engaging grooves 22 are configured from three engaging grooves disposed on the outer circumferential surface on a rear end side of the fixed barrel 2 along the circumferential direction. Each engaging groove 22 is formed so as to be concave with a predetermined depth from the outer circumferential surface of the fixed barrel 2 and with a predetermined length in the circumferential direction. Each engaging groove 22 of this embodiment includes an opening 22a leading to the rear end of the fixed barrel 2 on one end thereof, so that an engaging piece 81 of a drive operation member body 51 described later can be inserted into each engaging groove 22 from this opening 22a (bayonet structure).

The auto focus operation portion includes an input ring for auto focus 63 shown in FIG. 1, and a motor (not shown).

The input ring for auto focus 63 is a cylindrical member, and includes, on an outer circumference on the rear side, a gear portion 63a that is a motor connecting portion meshed with and connected to an output gear, which is provided on the motor, in a rotation transmissive manner. The input ring for auto focus 63 includes, on a front surface, a first roller rolling portion 63b where rolling rollers 42b described later roll.

The input ring for auto focus 63 thus configured is disposed on an outer circumference of the fixed barrel 2 so as to be rotatable about an axis of the fixed barrel 2. The gear portion 63a and the output gear of the motor are connected in a rotation transmissive manner in this state, so that the input ring for auto focus 63 rotates with actuation of the motor.

The manual focus operation portion includes an input ring for manual focus 71, and a manual operation ring 72 operating the input ring for manual focus 71.

The input ring for manual focus 71 is a ring plate-like member that is a ring-shaped plate obtained by forming a circular through opening on a circular plate-like member, and includes, on a rear surface, a second roller rolling portion 71a where the rolling rollers 42b described later roll. This input ring for manual focus 71 is disposed on a front side opposite to a side of the input ring for auto focus 63 with the rolling rollers 42b therebetween in the axial direction of the fixed barrel 2 so as to be rotatable about the axis of the fixed barrel 2.

The manual operation ring 72 is a cylindrical member, and includes, on an inner circumferential side, an operation portion 72a configured from a flange formed integrally with this cylindrical member. This operation portion 72a is a ring plate-shaped member, and operates the input ring for manual focus 71 from the front side through an urging member 11 described later.

Figure 7:
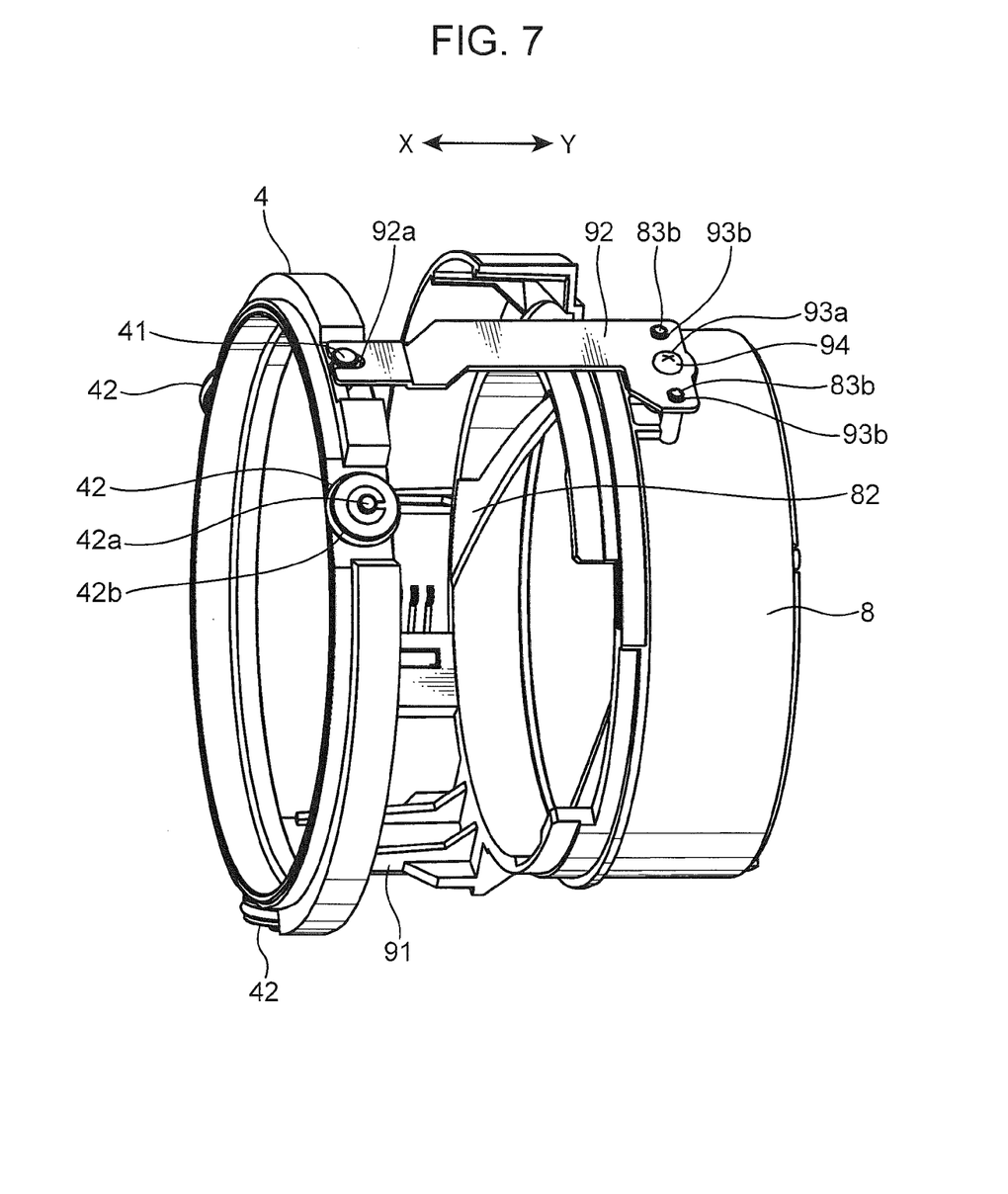
FIG. 7 is a perspective view of a state where a rotating member and the lens drive operation member included in the lens unit are connected.
Figure 8:
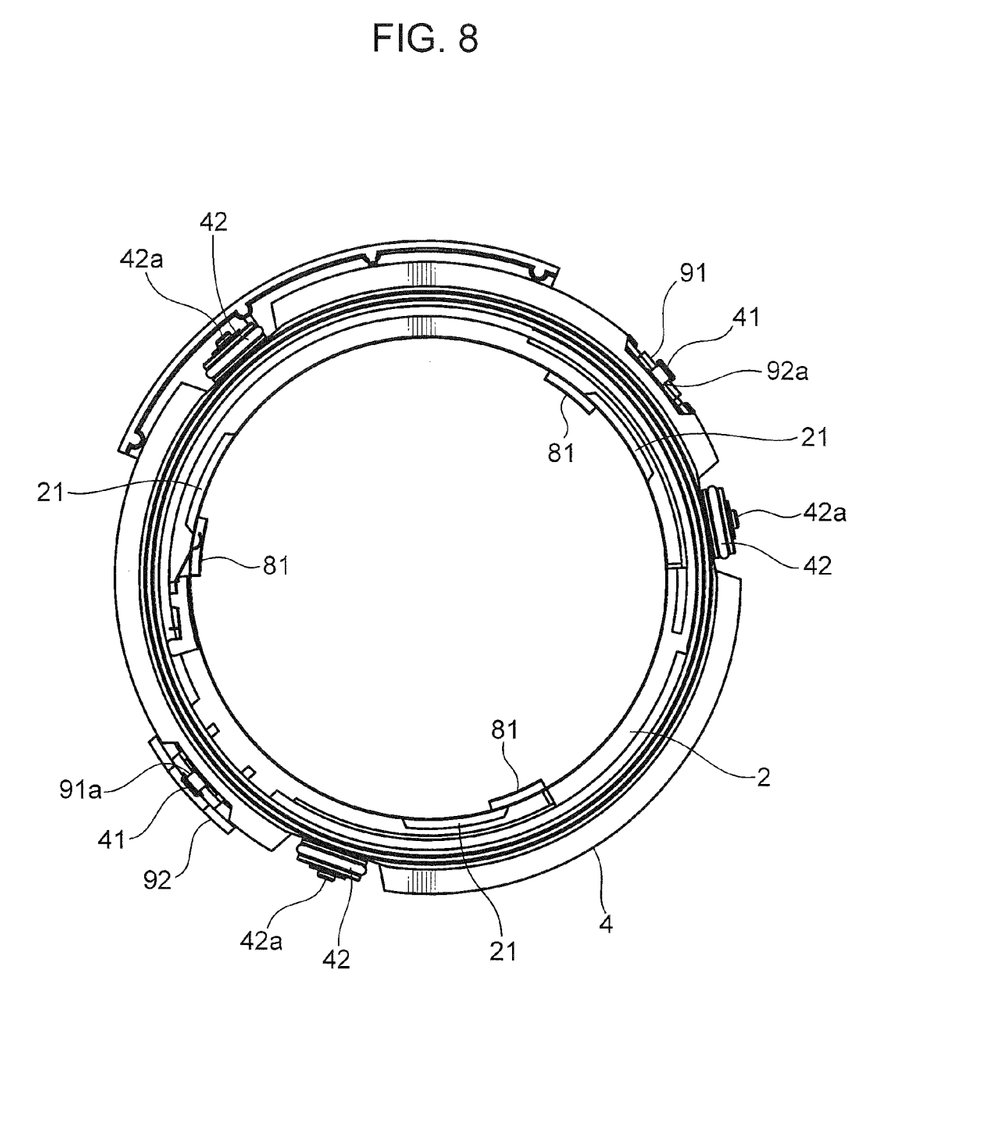
FIG. 8 is a front view of the state where the rotating member and the lens drive operation member are connected.

Next, the rotating member 4 will be described. As shown in FIG. 7 and FIG. 8, the rotating member 4 is a cylindrical member, and includes, on an outer circumferential surface, two connecting pins 41 connected to two connecting levers 91 and 92 of the lens drive operation member described later, respectively.

According to this embodiment, these connecting pins 41 are formed at positions separated from each other by an interval of 180° in the circumferential direction so as to protrude radially outward from the outer circumferential surface. This rotating member 4 is provided with at least three interlocking members 42 (three in this embodiment).

The interlocking members 42 are each a member that interlocks the rotating member 4 with the aforementioned input ring for auto focus 63, and interlocks the rotating member 4 with the aforementioned input ring for manual focus 71, and each of the interlocking members 42 includes a roller shaft 42a and a rolling roller 42b. Each rolling roller 42b is rotatably supported by the roller shaft 42a.

Each roller shaft 42a supporting the rolling roller 42b is mounted on the rotating member 4 such that the rolling roller 42b is disposed on the outer circumference side of the rotating member 4, and that an axial direction of the roller shaft 42a is disposed in a direction orthogonal to the axis of the fixed barrel 2 (orthogonal to an optical axis). As shown in FIG. 1, in this state, the rolling rollers 42b protrude in the axial direction from both front and rear end surfaces in the axial direction of the rotating member 4. Thus, the three interlocking members 42 mounted on the rotating member 4 are disposed at equal intervals in the circumferential direction of the rotating member 4 (see FIG. 8).

The rotating member 4 thus configured is disposed on the outer circumference side of the fixed barrel 2 between the input ring for auto focus 63 and the input ring for manual focus 71 in the axial direction of the fixed barrel 2 so as to be rotatable about the axis of the fixed barrel 2 (about the optical axis) with respect to the fixed barrel 2.

In this state, the rolling rollers 42b are disposed between the input ring for auto focus 63 and the input ring for manual focus 71, and are sandwiched between these input rings in a state of pressurization with the urging member 11.

More specifically, the urging member 11 made from a corrugated sheet ring shaped spring is provided between the operation portion 72a of the manual operation ring 72 and the input ring for manual focus 71, and urges the input ring for manual focus 71 toward the input ring for auto focus 63 on the rear side.

The second roller rolling portion 71a of the input ring for manual focus 71 presses the rolling rollers 42b with this urging force, and the rolling rollers 42b press the first roller rolling portion 63b of the input ring for auto focus 63 with this pressing force.

Thus, the rolling rollers 42b are sandwiched between the first roller rolling portion 63b and the second roller rolling portion 71a in a state where constant urging force is applied.

Next, the movable lens holding member 7 will be described. The movable lens holding member 7 is configured from a cylindrical member, and fixedly holds the movable lens group 33 on the inner circumferential side. The movable lens holding member 7 includes three sliding pieces 7b (only one of these sliding pieces is represented in FIG. 1) disposed on the outer circumference side at equal intervals along the circumferential direction.

These sliding pieces 7b are movably inserted into the guide grooves 21 of the fixed barrel 2 and cam grooves 82 of the drive operation member body 8 described later.

Next, the lens drive operation member 5 will be described. As shown in FIG. 3, the lens drive operation member 5 includes the cylindrical drive operation member body 8 connected to the movable lens group 33, and connecting levers (connecting members) 91 and 92 connecting the drive operation member body 8 and the rotating member 4.

Figure 4:
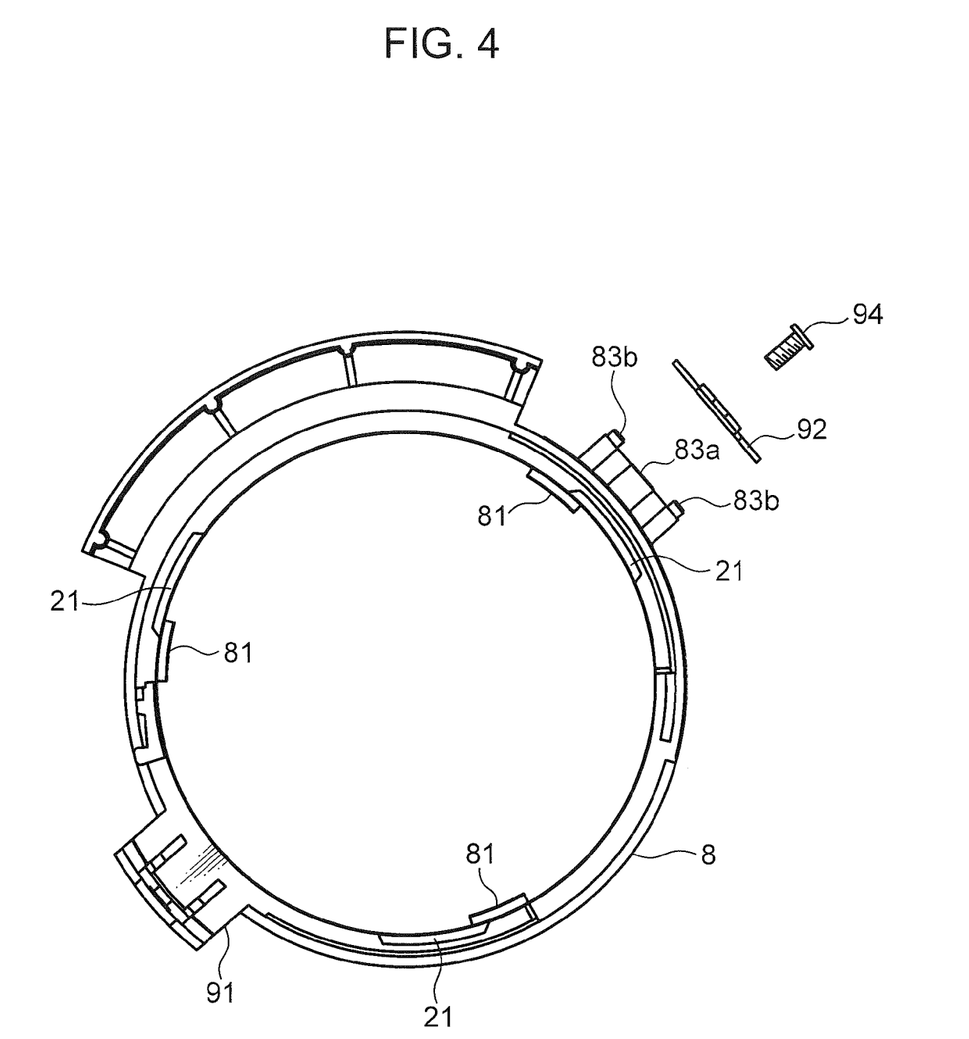
FIG. 4 is an exploded front view of the lens drive operation member.

The drive operation member body 8 is configured from synthetic resin, and includes, on an inner circumference, the three engaging pieces 81 formed along the circumferential direction as shown in FIG. 4, and the three cam grooves 82 (see FIG. 3).

The engaging pieces 81 are pieces for engaging the drive operation member body 8 with the fixed barrel 2 such that the drive operation member body 8 is rotatable about the axis of the fixed barrel 2 (about the optical axis) and is not movable in the axial direction, and are disposed on three portions in the circumferential direction on the rear section side of the drive operation member body 8. Each engaging piece 81 projects radially inward from the inner circumference to have a width capable of being inserted through the engaging groove 22 of the fixed barrel 2.

The cam grooves 82 are grooves for driving the movable lens holding member 7 in the axial direction of the fixed barrel 2 at the time of rotation of the drive operation member body 8, and each cam groove 82 is formed so as to extend diagonally rearward from a front end surface of the drive operation member body 8 and form a predetermined angle with respect to the axial direction and the circumferential direction.

The drive operation member body 8 includes, on an outer circumferential surface on the front section side, a lever connecting portion 83 connecting the second connecting lever 92 described later. The lever connecting portion 83 of this embodiment includes a single screw hole 83*a*, and engaging projecting pieces 83*b* disposed with the screw hole 83*a* therebetween on both sides in the circumferential direction.

As shown in FIG. 3 and FIG. 4, the connecting levers include the first connecting lever (first connecting member) 91 made of synthetic resin, which is formed integrally with the drive operation member body 8, and the second connecting lever (second connecting member) 92 made of metal, which is formed separately from the drive operation member body 8.

The first connecting lever 91 is an elongated plate-like member. The first connecting lever 91 has a proximal end integrally connected to the front end of the drive operation member body 8. The first connecting lever 91 has a distal end extending frontward along the axial direction of the drive operation member body 8 from the front end of the drive operation member body 8. Thus, the first connecting lever 91 is vertically arranged on the front end of the drive operation member body 8 so as to extend along the axial direction.

A connecting hole 91*a* connected to the connecting pin 41 of the rotating member 4 is provided on the distal end of the first connecting lever 91. The connecting hole 91*a* is formed so as to have a predetermined length along the axial direction from the distal end of the first connecting lever 91 and penetrate from a first surface to a second surface in a thickness direction of the first connecting lever 91.

The second connecting lever 92 is provided with a connecting hole 92*a* connected to the connecting pins 41 of the rotating member 4 on a distal end thereof. The connecting hole 92*a* has the same configuration as the aforementioned connecting hole 91*a* of the first connecting lever 91.

The second connecting lever 92 includes, on a proximal end thereof, a body connecting portion 93 connected to the lever connecting portion 83 of the drive operation member body 8. This body connecting portion 93 includes a screw insertion hole 93*a* provided at a position corresponding to the screw hole 83*a* of the lever connecting portion 83, and projecting piece engaging holes 93*b* provided at positions corresponding the respective two engaging projecting pieces 83*b* of the lever connecting portion 83.

As shown in FIG. 1, the drive operation member body 8 in the drive operation member thus configured receives the fixed barrel 2 on the inner circumference thereof by insertion of the fixed barrel 2 such that distal ends of the sliding pieces 7*b* entering the guide grooves 21 of the fixed barrel 2 enter the cam grooves 82 of the drive operation member body 8.

At the time of this insertion, each engaging piece 81 of the drive operation member body 8 enters the engaging groove 22 of the fixed barrel 2 from the opening 22*a* (see FIG. 2), and the connecting hole 91*a* of the first connecting lever 91 enters any one of connecting pins 41 of the rotating member 4.

Thus, the drive operation member body 8 is held on the outer circumference of the fixed barrel 2 so as not to be movable in the axial direction and so as to be rotatable about the axis, and the first connecting lever 91 and the rotating member 4 are connected.

From this state, the respective engaging projecting pieces 83*b* of the lever connecting portion 83 are inserted into the projecting piece engaging holes 93*b* of the second connecting lever 92, and the other of the connecting pins 41 of the rotating member 4 is inserted into the connecting hole 91*a* of the second connecting lever 92.

Additionally, in this state, a screw (fixed member) 94 is threadably clamped to the screw hole 83*a* of the lever connecting portion 83 from the screw insertion hole 93*a* of the second connecting lever 92 to be fixed. Thus, the second connecting lever 92 is connected to the rotating member 4 and the drive operation member body 8.

At this time, the second connecting lever 92 is formed separately from the drive operation member body 8, and hence when the drive operation member body 8 and the rotating member 4 are connected, the drive operation member body 8 and the rotating member 4 can be adjust so that the relative movement between the drive operation member body 8 and the rotating member 4 is not restricted due to productions error of the both components, dimensional tolerance at the time of production, or the like. Further, one of or both of the components can be prevented from being difficult to be rotated with respect to the fixed barrel 2. Accordingly the both components can be smoothly rotated with respect to the fixed barrel 2.

The second connecting lever 92 and the drive operation member body 8 are clamped together on a single portion with a single screw 94 to be fixed, and hence the clamping of the screw 94 is not influenced by accuracy of the mounting portion of the second connecting lever 92 and the drive operation member body 8. Therefore, distortion of the drive operation member body 8 with the clamping of the screw 94 can be reduced as compared with a case of clamping and fixing on a plurality of portions with a plurality of screws. Accordingly, the movable lens holding member 7 can be held at a predetermined position by the drive operation member body 8, and reduction in driving accuracy can be suppressed. In the case of clamping on a plurality of portions, the rigidity of the second connecting lever 92 is high, and hence the cylindrical shape of the drive operation member body 8 may be deformed by a shape error of the component. However, this can be prevented.

In a state where the second connecting lever 92 is connected to the rotating member 4 and the drive operation member body 8, the first connecting lever 91 and the second connecting lever 92 are arranged to be separated from each other in the circumferential direction by an interval of 180°, namely, arranged at equal intervals in the circumferential direction (arranged to be opposed with the optical axis therebetween).

Next, the motion of the lens barrel 10 thus configured will be described. When the auto focus operation portion allows the movable lens group 31 to be movable, an auto focus switch (now shown) is turned on. Due to this, the motor rotates in accordance with control of a control circuit (not shown), the input ring for auto focus 63 rotates with this rotation.

Additionally, with this rotation, the rolling rollers 42*b* roll on the first roller rolling portion 63*b*. At this time, the rolling rollers 42*b* are sandwiched between the first roller rolling portion 63b and the second roller rolling portion 71a of the input ring for manual focus 71, and the rotation of the input ring for manual focus 71 is regulated by the urging force of the urging member 11 or the like, and hence the rolling rollers 42b revolve around the axis of the fixed barrel 2 while rotating. Due to this, the rotating member 4 holding the rolling rollers 42b rotates.

Then, the first connecting lever 91 and the second connecting lever 92 rotate about the axis of the fixed barrel 2 by the rotation of the rotating member 4. Due to this, the drive operation member body 8 rotates. At this time, the two connecting levers 91 and 92 disposed at a pitch of 180° in the circumferential direction (at equal intervals in the circumferential direction) can effectively transmit the rotational force of the rotating member 4 to the drive operation member body 8 to rotate the drive operation member body 8. The two connecting levers 91 and 92 are disposed at the equal intervals in the circumferential direction, and hence reaction forces applied to the respective connecting levers 91 and 92 cancel each other, and reduction in driving efficiency can be prevented.

The sliding pieces 7b entering the guide grooves 21 of the fixed barrel 2 and the cam grooves 82 of the drive operation member body 8 move through these grooves 21 and 82 by the rotation of the drive operation member body 8. Due to this, the movable lens group 31 moves in the axial direction of the fixed barrel 2.

On the other hand, in a case where the rotation operation of the manual operation ring 72 is performed by hands (manually performed) from this state, this rotates the input ring for manual focus 71, and the rolling rollers 42b roll on the second roller rolling portion 71a. At this time, the input ring for auto focus 63 sandwiching the rolling rollers 42b between the input ring for auto focus 63 and the second roller rolling portion 71a meshes with the motor and cannot rotate, and hence rolling rollers 42b revolve around the fixed barrel 2 while rotating, and the whole rotating member 4 rotates. Similarly to the aforementioned manner, the drive operation member body 8 is rotated by the rotation of the connecting levers 91 and 92 rotates, thereby allowing the movable lens group 31 to drive in the axial direction of the fixed barrel 2.

Due to the aforementioned configuration, it is possible to effectively transmit the rotational force of the rotating member 4 to the drive operation member body 8 and rotate the drive operation member body 8 by at least the two connecting levers 91 and 92 disposed along the circumferential direction of the fixed barrel 2, without applying force other than the force in the rotational direction. At the time of the rotation of the drive operation member body 8, in order to perform the drive operation of the movable lens holding member 7 holding the movable lens group 33, a drive loss caused in a case of driving the movable lens holding member 7 can be reduced and the movable lens holding member 7 can be smoothly driven. Additionally, it is not necessary to rotationally drive the movable lens group and provide a spiral cutout like a conventional one in order to drive the movable lens holding member 7 with the rotatable drive operation member body 8, and the rigidity and the accuracy of the fixed barrel 2 can be improved.

The first connecting lever 91 and the drive operation member body 8 are integrally molded by synthetic resin, and hence it is possible not to cause displacement of the first connecting lever 91 with respect to the drive operation member body 8, and connecting work is not required. In fabrication, the first connecting lever 91 can be fabricated at the same time as the fabrication of the drive operation member body 8, and the first connecting lever 91 can be easily fabricated. The first connecting lever 91 and the drive operation member body 8 are integrally molded by synthetic resin, and hence the whole lens barrel 10 can be reduced in weight.

The second connecting lever 92 is configured from a metal plate, so that the radial size of the second connecting lever 92 can be reduced. Thus, increase in the size of the whole lens barrel 10 can be suppressed.

According to the aforementioned embodiment, the two connecting levers 91 and 92 are configured. However, three or more connecting levers may be configured, and the number of the connecting levers can be appropriately changed. Additionally, the positional relation of the connecting levers 91 and 92 is not limited to a configuration in which two or a plurality of connecting levers are disposed at equal intervals in the circumferential direction as in the aforementioned embodiment, and can be appropriately changed.

While the present Description discloses the various aspects of the techniques shown in above, the summary of the main techniques among these is as follows.

A lens barrel according to an aspect includes a fixed barrel; a lens holder (movable lens holding member) holding a movable lens group, and disposed on the fixed barrel so as to be movable in an axial direction; a cylindrical rotating member disposed so as to be rotatable with respect to the fixed barrel; and a lens drive operation member connecting the lens holder and the rotating member. In this lens barrel, the lens drive operation member drives the lens holder in the axial direction by rotation operation of the rotating member. The lens drive operation member has a cylindrical drive operation member body connected to the rotating member, and a connecting member connecting the drive operation member body and the rotating member. The drive operation member body is disposed so as to be rotatable about an axis of the fixed barrel and so as not to be movable in the axial direction, and drives the lens holder in the axial direction when rotated with respect to the fixed barrel. The connecting member includes at least two connecting member, that is, a first connecting member and a second connecting member disposed to have a distance therebetween in a circumferential direction of the fixed barrel. The first connecting member is formed integrally with the drive operation member body, and the second connecting member is a member formed separately from the drive operation member body, and is held by the drive operation member so as to be capable of adjusting a holding position.

In such a lens barrel, rotational force of the rotating member can be effectively transmitted to the drive operation member body without applying force other than the force in the rotational direction, by as least the two connecting members disposed along the circumferential direction of the fixed barrel. Additionally, the drive operation member body can be smoothly rotated without applying resistance other than resistance in the rotational direction to the rotating member. At the time of the rotation of the drive operation member body, the movable lens holding member holding the movable lens group is driven, thereby being capable of reducing a drive loss caused in a case of driving the movable lens group, and smoothly driving the movable lens group. The movable lens holding member is driven by the rotatable drive operation member body, and hence it is not necessary to provide a cam groove, or the like on a fixed barrel, like a conventional one, and the rigidity and the accuracy of the fixed barrel can be improved. Furthermore, the lens holding member holding the movable lens group can be displaced only in the axial direction (optical axis direction) of the fixed barrel without rotating the lens holding member, and hence optical performance becomes stable.

The first connecting member is formed integrally with the drive operation member body, and hence the number of components can be reduced and fabrication is facilitated, as compared with a case where the first connecting member is formed separately from the drive operation member body.

On the other hand, for example, in a case where both of the first connecting member and the second connecting member are formed integrally with the drive operation member body, when the drive operation member body and the rotating member are connected, one of or both of the drive operation member body and the rotating member may be unable to rotate smoothly by production errors of the both components or the like. In the case where the drive operation member body and the rotating member cannot rotate smoothly, large backlash is needed, and driving accuracy or operation feel are deteriorated. As described above, the second connecting member is formed separately from the drive operation member body, and hence it is possible to adjust a holding position so as not to restrict the relative movement between the drive operation member body and the rotating member when connecting the drive operation member body and the rotating member, and to smoothly rotate one of or both of the components with respect to the fixed barrel without backlash.

In another aspect, in the aforementioned lens barrel, the first connecting member and the drive operation member body are preferably integrally molded by a synthetic resin material.

In such a lens barrel, the first connecting member is formed by being molded integrally with the drive operation member body, and hence it is possible not to cause displacement of the first connecting member with respect to the drive operation member body, and connecting work is not required. Additionally, in fabrication, the first connecting member can be fabricated at the same time as the fabrication of the drive operation member body, and the first connecting member can be easily fabricated. Furthermore, the first connecting member and the drive operation member body are integrally molded by synthetic resin, and hence the lens barrel can be manufactured at a low cost in addition to weight saving.

In yet another aspect, in the aforementioned lens barrel, the second connecting member is preferably made of metal.

In such a lens barrel, even when the second connecting member is configured, for example, from a plate-like member, the second connecting member can become a member having a sufficient strength. Due to this, the radial size of the whole lens barrel can be reduced, and increase in the size can be suppressed.

In yet another aspect, in the aforementioned lens barrel, the second connecting member and the drive operation member body are preferably fixedly connected by a fixed member on a single portion.

In such a lens barrel, the second connecting member and the drive operation member body are clamped together on a single portion, for example, with a screw as a fixed member, for connection, and hence distortion of the drive operation member body with the clamping of the screw can be suppressed as compared with a case of clamping of screws on a plurality of portions. Additionally, rigidity is increased, and hence the lens barrel is unlikely to be broken when external force is applied. Thus, the movable lens holding member can be held at a predetermined position by the drive operation member body, and reduction in driving accuracy can be suppressed.

In yet another aspect, in the aforementioned lens barrel, the first connecting member and the second connecting member are preferably arranged at equal intervals in the circumferential direction, that is, arranged to be opposed with an optical axis therebetween.

In such a lens barrel, reaction forces applied to the respective connecting members cancel each other, and reduction in driving efficiency can be prevented.

A lens unit according to yet another aspect includes any of the aforementioned lens barrels; and a single or a plurality of lenses held in the lens barrel.

In such a lens unit, it is possible to smoothly perform a drive operation of the movable lens holding member holding the movable lens group with respect to the fixed barrel with small force.

This application is based on Japanese Patent application serial No. 2011-275690 filed in Japan Patent Office on Dec. 16, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A lens barrel comprising:
a fixed barrel;
a lens holder holding a movable lens group, and disposed on the fixed barrel so as to be movable in an axial direction of the fixed barrel;
a cylindrical rotating member disposed so as to be rotatable with respect to the fixed barrel; and
a lens drive operation member connecting the lens holder and the rotating member, and driving the lens holder in the axial direction by rotation operation of the rotating member, wherein
the lens drive operation member has a cylindrical drive operation member body connected to the rotating member, and a connecting portion connecting the drive operation member body and the rotating member,
the drive operation member body is disposed so as to be rotatable about an axis of the fixed barrel and so as not to be movable in the axial direction, and drives the lens holder in the axial direction when rotated about the axis of the fixed barrel,
the connecting portion includes a first connecting member and a second connecting member disposed to have a distance therebetween in a circumferential direction of the fixed barrel,
the first connecting member is formed integrally with the drive operation member body, and
the second connecting member is a member formed separately from the drive operation member body, and is held by the drive operation member so as to be capable of adjusting a holding position.

2. The lens barrel according to claim 1, wherein the first connecting member and the drive operation member body are integrally molded by a synthetic resin material.

3. The lens barrel according to claim 1, wherein the second connecting member is made of metal.

4. The lens barrel according to claim 1, further comprising:
a fixed member fixedly connecting the second connecting member and the drive operation member body on a single portion.

5. The lens barrel according to claim 1, wherein
the first connecting member and the second connecting member are arranged at equal intervals in the circumferential direction.

6. A lens unit comprising:
the lens barrel according to claim 1; and
a single or a plurality of lenses held in the lens barrel, wherein
the movable lens group is included in the single or plurality of lenses.

* * * * *